Patented Oct. 29, 1929

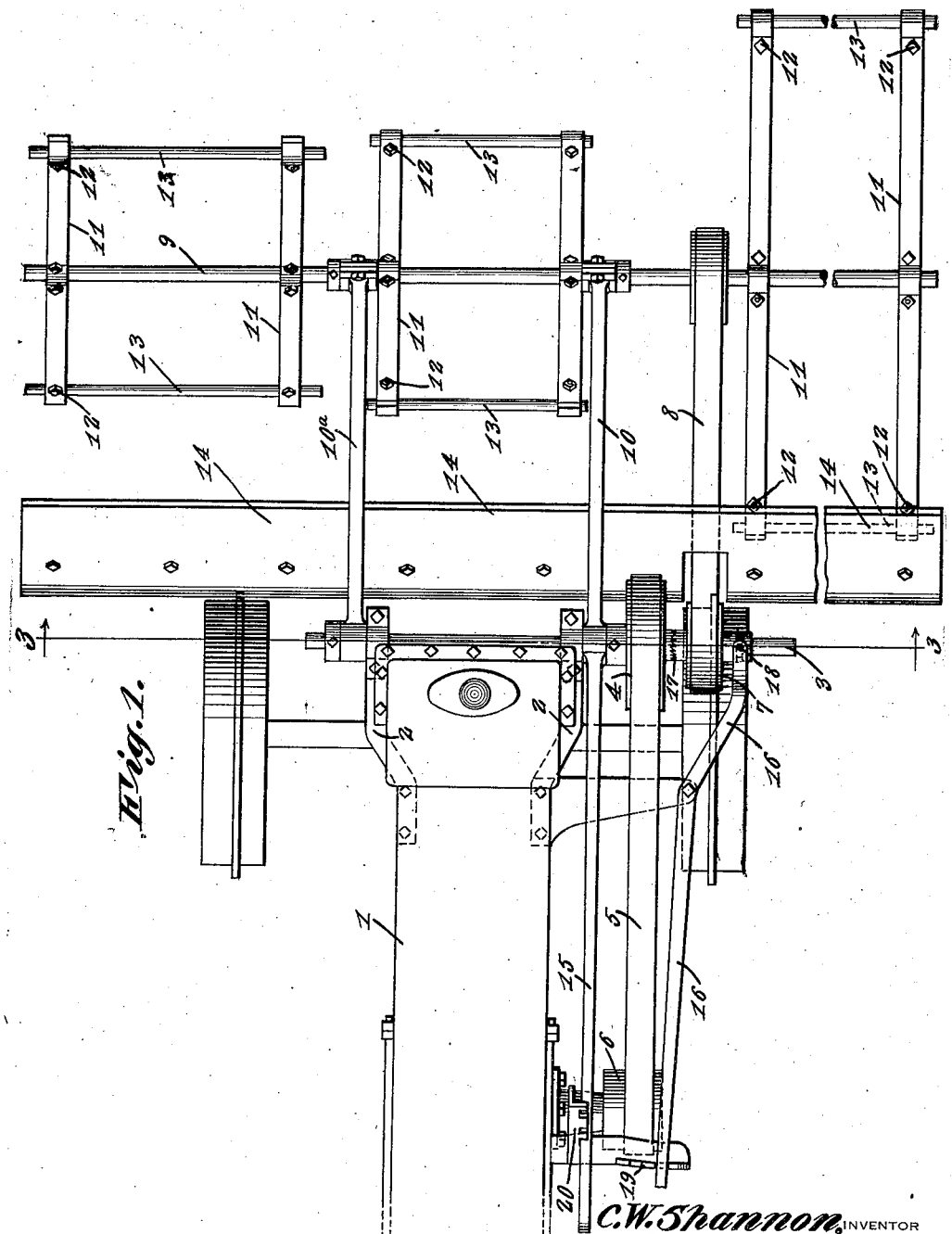

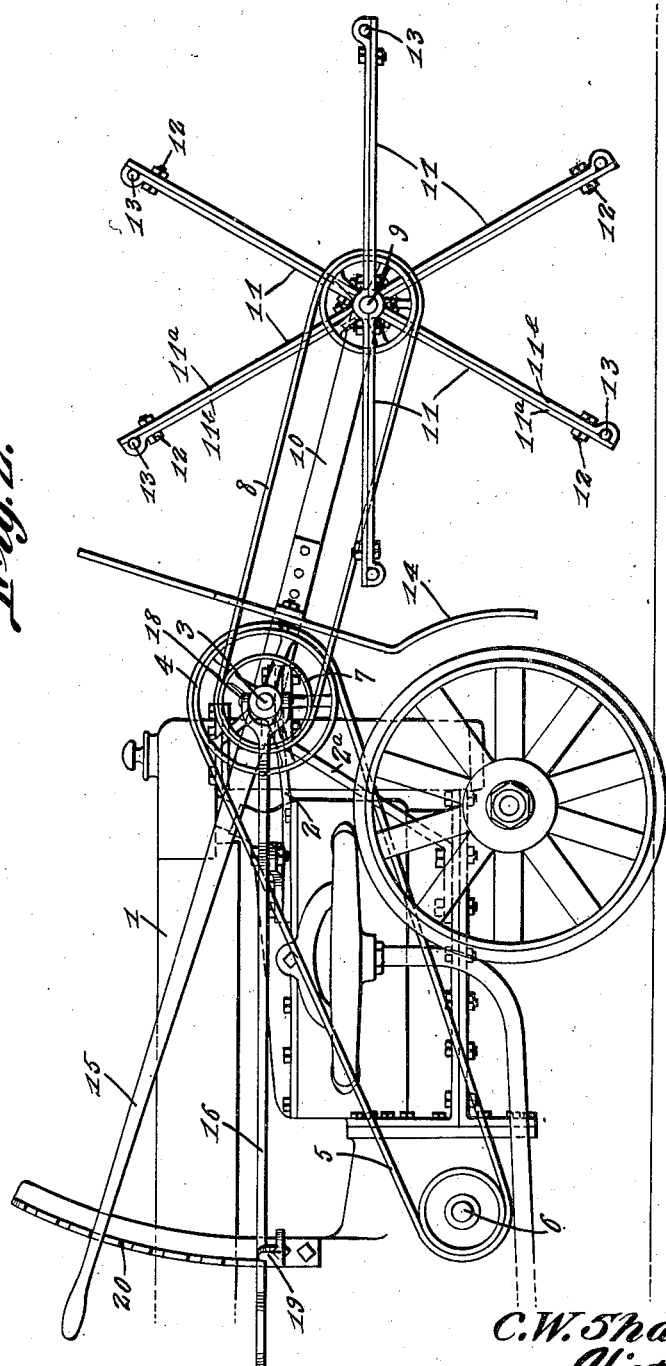

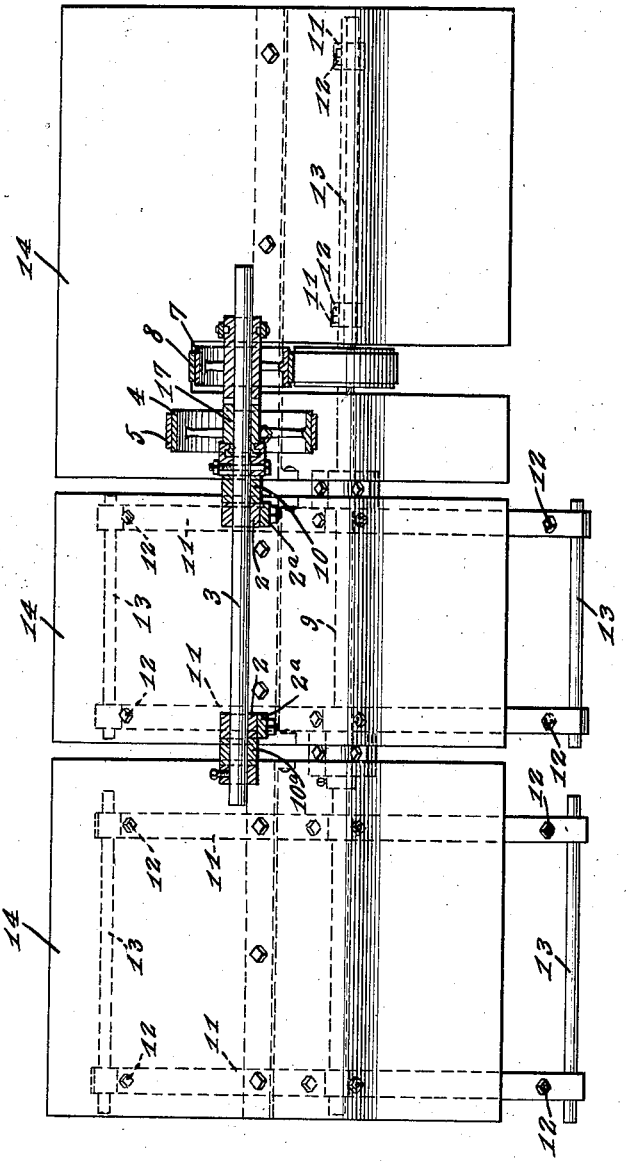

1,733,913

UNITED STATES PATENT OFFICE

CARL W. SHANNON, OF JEROME, ARKANSAS

STALK REMOVER

Application filed August 13, 1927. Serial No. 212,808.

This invention relates to a machine for disintegrating stalks, such as cotton, corn, cane or the like, and is designed to break the stalks growing on the field into small disintegrated particles by a beating action so that they may be readily affected by moisture and atmospheric conditions and come to a chemical condition in which they may be readily assimilated by the soil, thereby rendering them in a condition in which at any stage of their disintegration there is a minimum interference with crop cultivation.

In carrying out my invention I mount on a power-driven tractor a countershaft on which is mounted a lever-controlled forwardly projecting framework carrying a rotary beater composed of a plurality of radial arms with transversely mounted beater rods which are driven at a high revolution, from 300 to 400 R. P. M., and are raised and lowered relatively to the ground so as to intercept the dried stalks progressively and reduce them to small fragments by the force of impact of the rapidly driven rods, intermittently engaging the stalk from the top downward as the machine moves forward and drives the rotary beater. Behind the beater is arranged a guard or fender which prevents the disintegrated material from being passed into the machinery of the traction machine or against the operator thereof.

My invention therefore consists of a plurality of radial beaters rapidly power-driven and impelled forward by the traction machine, during which time they are lowered gradually toward the ground so as to disintegrate dried stalks in the field. Other more specific features of the invention will be indicated in the following specification and specifically indicated in the claims.

In the drawings:

Figure 1 is a plan view of a machine embodying my improvements.

Figure 2 is a side elevation thereof.

Figure 3 is a horizontal section on the plane 3—3 of Figure 1 looking in the direction of the arrows.

Referring now in particular to the drawings, 1 represents a tractor, as a Fordson or other type of traction engine, on some part of the solid framework of which, as for instance by brackets 2, 2ª, is formed a framework to support a countershaft 3 on which is mounted a large pulley 4 connected by a belt 5 with the drive shaft 6 of the internal combustion motor. The countershaft carries a pulley 7 adapted to form a drive by a belt 8 for a beater shaft 9 carried by a pair of arms 10, 10ª carrying the beater shaft well forward of the machine so that as the machine is driven forward the beaters may engage and intercept rows of stalks in the corn, or cotton field, or other cultivated tract. The machine is driven forward and by the gearing just described puts into rapid rotation a plurality of radial beaters 11 grouped around a spider on the beater shaft 9, the several radial beater arms being sectional and composed of strips of bar iron 11ª, 11ᵇ clamped together by bolts 12 at the outer end to clamp beater rods 13 nested between the two radial bar sections, one of which has a curved tip to form a recess for the rod. Bolted on the arms 10, 10ª on a suitable bracket mounted thereon is a guard or fender 14 to prevent the disintegrated material broken by the beaters from being cast upon the working parts of the machine or interfering with the driver's control. 15 represents a control lever controlling the parallel arms 10, 10ª to raise and lower the beater frame, and 16 represents a lever to control a clutch 17 provided with a notched periphery to cooperate with a similar side periphery of the drive pulley 4 for the countershaft. The lever 16 mounted on a lateral bracket secured to the engine is pivotally connected at 18 with a grooved collar connected to the splined clutch pulley 7 engaged by the belt 8. The lever 16 is provided near its end with a quadrant 19 by which it may be latched when shifted into engagement with the drive pulley 4. The lever 15, which is a rearward extension of one of the carriers for the rotary beater, is in cooperative relation to a notched sector or quadrant 20 by which its movements may be latched or steadied by control of the operator.

When in operation the machine is driven forward and when in proximity to the several rows of stalks, the clutch is thrown into action and the lever 15 raised, thereby lowering the beater frame during its rapid rotation and causing the beater rods 13 to progressively intercept the stalk or stalks and by the impact of the blow snap off small sections and cast them downwardly and rearwardly. The beater frames, of which I prefer to employ three as indicated in the figures of the drawings, may be set at different angles so that the engagement with say three rows of stalks will intermit the action of the rods against the adjacent stalks in different rows.

My invention is different in its action from machines employing knives and by reason of its action progressively on different parts of the stalks it is not necessary that it should be brought into contact with the ground, so that it can be successfully employed on sticky buckshot or clay lands where stalk cutters have difficulty by reason of clogging with mud and trash.

As my machine takes three rows of stalks at a time and breaks the stalks into very small pieces, it can be operated rapidly to denude a field of stalks. A great advantage arises from the fact that I employ rods instead of knives or cutters, as the rods are always in commission for active work and reduce the cost of operation considerably.

Having thus described my invention, what I claim as new and desire to secure by Letters Patent is:

1. A stalk threshing machine comprising a tractor, a countershaft mounted on the forward end of the tractor, a breaker shaft, a belt drive between the countershaft and the breaker shaft, said breaker having a pair of radial bars carrying a plurality of transverse beater rods to break the stalks progressively, and a lever to depress the breaker shaft and bring the successive rods into intermittent action progressively along the stalks.

2. A stalk thresher comprising a tractor, a countershaft in front thereof, a power drive to the countershaft, a lever to clutch the power shaft, a pair of pivoted arms on the countershaft, a beater shaft transverse thereof, a belt drive between the countershaft and the beater shaft, transverse beater rods mounted radially of the beater shaft, a lever having connection with one of the pivoted arms to lower the beater shaft during the progress of the tractor, and a shield to guard the machine operator from the broken stalks and deflect same upon the surface of the soil for assimilation thereby.

In testimony whereof I affix my signature.

CARL W. SHANNON.